United States Patent
Kominami et al.

[15] 3,689,583
[45] Sept. 5, 1972

[54] PRODUCTION OF DIMETHYLSTYRENES

[72] Inventors: Naoya Kominami, 27-6, 3-chome, Nakadai, Itabushi-ku, Tokyo; Nobuhiro Tamura, 38, Tsuruoka, Ooimachi, Iruma-gun, Saitma-ken; Etsuo Yamamoto, 27-6, 3-chome, Nakadai, Itabushi-ku, Tokyo, all of Japan

[22] Filed: Dec. 2, 1969

[21] Appl. No.: 881,621

[30] Foreign Application Priority Data

| June 3, 1969 | Japan | 44/42931 |
| Sept. 22, 1969 | Japan | 44/74585 |
| June 2, 1969 | Japan | 44/42476 |
| May 22, 1969 | Japan | 44/39133 |
| Dec. 10, 1968 | Japan | 43/89938 |
| May 28, 1969 | Japan | 44/40990 |

[52] U.S. Cl. ....... 260/669 R, 260/671 A, 260/671 C, 260/674 A
[51] Int. Cl. ............................................. C07c 15/10
[58] Field of Search ...... 260/671 A, 671 C, 669, 497, 260/497 A, 499

[56] References Cited
UNITED STATES PATENTS

| 3,479,392 | 11/1969 | Stern et al. | 260/497 |
| 3,458,562 | 7/1969 | Shier | 260/497 A |
| 3,505,394 | 4/1970 | Oliver | 260/499 |
| 3,527,794 | 9/1970 | Heck | 260/669 R |

FOREIGN PATENTS OR APPLICATIONS

| 1,576,819 | 8/1969 | France |

*Primary Examiner*—Curtis R. Davis
*Attorney*—Burgess, Dinklage & Sprung

[57] ABSTRACT

Dimethylstyrenes are produced by reacting xylenes, ethylene and oxygen in the presence of a lower aliphatic carboxylate of palladium, according to the equation:

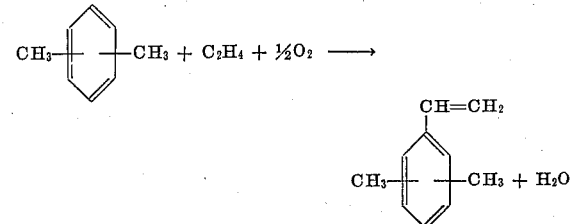

The palladium compound is preferably supported on a porous carrier, and promoted with an oxide or carboxylate of a metal such as copper, silver, lead, chromium or the like, and the catalyst is preferably conditioned with a basic nitrogen-containing organic compound.

11 Claims, No Drawings

PRODUCTION OF DIMETHYLSTYRENES

PRIOR ART

Dimethylstyrenes have been made by reacting xylene with acetaldehyde or acetylene to give diphenylmethanes U.S. Pat. Nos. 2,439,228 and 2,718,532) and subsequently subjecting the diphenyl methanes to pyrolysis (U.S. Pat. Nos. 2,422,169 and 2,422,318). These are, however, two-step processes and require expensive feed stocks.

Styrene has been produced by reacting palladium chloride, ethylene and benzene. However, according to this process at least one mol of palladium chloride which is relatively expensive, is necessary to produce one mol of styrene. It has been reported that the selectivity to styrene of this process is low and excessive amounts of stillbene are produced (I. Moritani et al. in Symposia on Organometallic Compounds — Lecture papers: pp. 220 to 228, 1966 and pp 225, 232, 1967).

THIS INVENTION

This invention is concerned with a precess for selectively preparing dimethylstyrenes by reacting xylenes, ethylene instead of acetylene, and oxygen in a single step with minimal formation of the corresponding stilbenes.

One aspect of this invention resides in the production of dimethylstyrenes without forming undesired by-products by reacting xylenes, ethylene and a free-oxygen containing gas in the presence of at least one lower aliphatic carboxylate of palladium. The lower aliphatic carboxylates of palladium include palladium (II) acetate, palladium (II) propionate and palladium (II) monochloroacetate.

In this embodiment the lower aliphatic carboxylate of palladium acts as a reactant, not as a catalyst.

Another aspect of this invention resides in selectively producing dimethylstyrenes by contacting xylenes, ethylene and a free-oxygen containing gas with, as a catalyst, the lower aliphatic carboxylate of palladium supported on a porous inert carrier.

To improve the activity of catalyst it has been found valuable to utilize, as a promotor, at least one member of the group consisting of the oxides and the lower aliphatic carboxylates of copper (II, silver (I), lead (II), chromium (II, III, VI), molybdenum (IV, V), tungsten (IV, VI), manganese (II, III), iron (III) and thallium (I, III).

The atomic ratio of palladium to the metal promotor is in the range of 1,000 – 1/500 : 1, preferably 500 – 1/100 : 1.

DESCRIPTION

Table 1 gives a comparison between the case where the lower aliphatic carboxylate of palladium acts as a reactant and the case where the lower aliphatic carboxylate of palladium alone, or together with the promotor, supported on a porous carrier acts as a catalyst.

As is clear from Table 1, in the case where palladium (II) acetate along (Catalyst No. 1) is used and benzene is the feed, a large amount of stilbene together with styrene is produced, while in the case of using palladium (II) acetate alone acting overall as a reactant and m-xylene, only 2,4-dimethylstyrene with a yield of 85 mol percent is produced without forming the corresponding stilbene, i. e., 2,4,2',4'-tetramethylstilbene. On the other hand, when the palladium (II)acetate is supported on silica as the porous carrier without a promoter (Catalyst No. 2), the yield of 2,4-dimethylstyrene increases in the course of reaction and attains 175 percent by mol per one mol of palladium, although the initial activity of catalyst is lower.

Obviously the palladium is being reused in this reaction. This discovery of the effect of the palladium makes it possible to carry out the process in the gaseous phase.

Palladium (II) acetate together with silver (I) acetate, as a promotor, supported on silica (Catalyst No. 3) remarkably improves the yield of 2,4-dimethylstyrene. Catalyst No. 4 illustrates that by supporting manganese (II) oxide on silica and subsequently adding the palladium (II) acetate, a greatly improved initial catalyst activity is achieved. The yield of 880 percent is quite outstanding. To obtain the same amount of 2,4-dimethylstyrene, the amount of Catalyst No. 4 required can be less than one tenth of that required for Catalyst No. 1.

Thus, according to a second embodiment of this invention, dimethylstyrenes can be much more economically produced by using, as a catalyst, the lower aliphatic carboxylate of palladium supported on a porous carrier.

Examples of suitable inert carriers are silica, alumina, silica-alumina, boria and active carbon, with silica and active carbon being preferred. The catalyst can be placed on the carrier by any of the conventional methods such as immersion, mixing or co-precipitation.

Nitrogen-containing basic organic compounds have been found to be effective for conditioning the catalyst, and are more effective than oxygen-containing compounds such as water, methanol and acetic acid. The nitrogen compounds remarkably reduce the formation of tolualdehyde as a by-product and increase the selectivity of the catalyst to dimethylstyrenes. This is shown in Table 2.

Suitable nitrogen-containing treating agents for the catalyst include amines such as ethylamine, aniline; nitriles such as acetonitrile, benzonitrile; N-heterocyclic compounds such as quinoline, pyridine and aqueous ammonia solutions.

When a nitrogen-containing compound is used to treat the catalyst, the lower aliphatic carboxylates of palladium to be used and the metal promoters can be simultaneously or alternatively dissolved in such nitrogen-containing compound and the carrier then added to the resultant solution with the mixture then being evaporated to dryness (e. g., Catalyst No. 3 in Table 1). The metal promotors can alternatively be supported on a carrier in the form of salts and subsequently calcined at a temperature of about 200° C. to 1,000° C. for about 2 to 20 hours in an air atmosphere to transform the promotors to their oxides. The calcined material can then be added to the lower aliphatic carboxylates of palladium, alone or together with the other promotors, dissolved in the nitrogen-containing compound and the mixture evaporated to dryness (e. g., Catalyst No. 4 in Table 1).

It has been found that the presence of a small amount of triphenylphosphine in the reaction system prevents a decrease in selectivity during the course of the reaction. This is shown in Table 3.

Although the amount of triphenyl phosphine varies depending upon the composition of catalyst, the reaction temperature and the composition of reactants, the preferred amount of triphenyl phosphine ranges from about 10 mg. to 500 mg. per one mol of the xylenes. When the amount is less than about 10 mg., the selectivity is lowered. On the other hand, amounts of triphenyl phosphine of more than about 500 mg. decrease the activity of catalyst.

The xylenes according to the present invention include o-xylene, m-xylene and p-xylene and mixtures thereof.

The products of the present process are 3,4-dimethyl-styrene where o-xylene is used as the starting material; 2,4-dimethylstyrene in the case of m-xylene; and 2,5-dimethylstyrene in the case of p-xylene and the corresponding dimethylstyrenes in the case of a mixture of the xylenes.

It has also been found that when using the lower aliphatic carboxylate of palladium and, as a promotor, the lower aliphatic carboxylate or the oxide of thallium in the second embodiment of this invention, p-xylene does not react at all, or barely reacts with the ethylene and oxygen. This phenomenon may be applied to the separation of p-xylene from a mixture of m-xylene and/or o-xylene with p-xylene.

Still another aspect of this invention resides in the separation of p-xylene by the production of 2,4-dimethylstyrene and/or 3,4-dimethylstyrene from a mixture of p-xylene with m-xylene and/or o-xylene.

The lower aliphatic carboxylates or the oxides of thallium can be used together with the other previously described promotors. This effect of the thallium compounds is shown in Table 4.

The process of this invention can be carried out in the presence of a saturated aliphatic acid to increase the reaction rate, but this is not essential.

Examples of suitable saturated aliphatic acids include acetic acid, propionic acid and butyric acid.

When the amount of the saturated aliphatic acids is too large the formation of aldehyde and the esters of aliphatic acid as by-product increases. Therefore, the volume ratio of these saturated aliphatic acids to the xylenes is preferably 1 or less than 1 : 3.

The mol ratio of ethylene to oxygen can be in the range of from 10 : 1 to 1 : 100. The ethylene and oxygen can be diluted with an inert gas such as nitrogen or carbon dioxide.

The reaction temperature is preferably in the range of from about 30° C to 400° C., preferably from about 50° to 200° C.

The reaction of the present invention can be carried out either at atmospheric pressure or under superatmospheric pressure, e.g. up to 100 atmospheres.

Further, the reaction can be batchwise or continuous and can be effected in either the gaseous phase or in the liquid phase.

When the reaction is effected in the gaseous phase the mol ratio of the total of ethylene and oxygen to xylene is preferably 1–20 : 1.

EXAMPLES

EXAMPLE 1

Into a 100 cc. three-necked flask equipped with a reflex condenser and a thermometer, there were charged 30 cc. of m-xylene, 10 cc of acetic acid and 647 mg. of palladium (II) acetate. After the flask had been furnished with a gas inlet tube and heated to 80° C, ethylene and oxygen was introduced at a rate of 30 cc./min. and 20 cc./min., respectively. The yield of 2,4-dimethyl styrene per one mol of palladium was 75 percent over 10 hours after the starting of reaction and no formation of the corresponding 2,4,2′,4′-tetramethyl stilbene was observed. (Mol percentages are used throughout the Examples).

EXAMPLE 2

In the same flask as in Example 1, there were charged 20 cc. of o-xylene, 15 cc. of acetic acid and 2.18 g. of palladium (II) propionate. The flask was maintained at 95° C. and the ethylene and oxygen were introduced at a rate of 20 cc./min. respectively. The yield of 3,4-dimethylstyrene per one mol of palladium was 72 percent over 6 hours after the starting of reaction and no formation of the corresponding 3,4,3′,4′-tetramethyl stilbene was observed.

EXAMPLE 3

In the same flask as in Example 1, there were charged 20 cc of p-xylene, 10 cc. of propionic acid and 647 mg. of palladium (II) acetate. The flask was maintained at 80° C. and ethylene and oxygen were introduced at a rate of 50 cc./min. and 20 cc./min. respectively. The yield of 2,5-dimethylstyrene per one mol of palladium was 41 percent over 8 hours after the starting of reaction and no formation of the corresponding 2,5,2′,5′-tetramethyl stilbene was observed.

EXAMPLE 4

0.2 g. of palladium (II) acetate and 0.2 g. of silver (I) acetate were dissolved in 20 cc. of a concentrated aqueous ammonia solution and 20 cc (11 g.) of granular silica gel were added thereto. The resultant mixture was evaporated to dryness on a hot water bath. 20 cc. of this catalyst, 50 cc. of m-xylene and 5 cc of acetic acid were charged to a 100 cc. microbomb and the microbomb was sealed. Ten Kg/cm². (gauge) of ethylene and 30 Kg./cm². (gauge) of oxygen were introduced therein and the microbomb was placed in an oscillating oil bath maintained at 120° C. for 5 hours. The yield of 2,4-dimethyl-styrene per one mol of palladium was 120 percent and the formation of a trace of vinyl acetate as a by-product was observed. After analysis the reaction solution was returned to the microbomb and 10 Kg/cm². (gauge) of ethylene and 30 Kg./cm² (gauge) oxygen were introduced therein and the reaction was carried out at 120° C. for 10 hours. The yield of 2,4-dimethyl-styrene per one mol of palladium was 230 percent and the formation of a trace of m-tolualdehyde and acetaldehyde besides the above-mentioned vinyl acetate was observed.

EXAMPLE 5

0.1 g. of palladium (II) acetate was dissolved in 10 cc. of pyridine, and 10 cc. of granular active carbon (4g.) were added thereto. The resultant mixture was evaporated to dryness. 10 cc. of this catalyst, 55 cc. of m-xylene and 5 cc. of acetic acid were charged in the same microbomb as in Example 4 and 5 Kg./cm², (gauge) of ethylene and 35 Kg.cm². (gauge) of oxygen were introduced. The reaction was carried out at 100° C. The yields of 2,4-dimethyl styrene per one mol of palladium were 75 percent over 2 hours after the starting of reaction, 105 percent after 5 hours and 200 percent after 15 hours. No formation of tolualdehyde, vinyl acetate and acetaldehyde as by-products was observed.

EXAMPLE 6

2.87 g. of manganese nitrate $Mn(NO_3)_2 \cdot 6H_2O$ were dissolved in 100 cc. of water and 50 cc. (27.5 g.) of silica were added thereto. The whole mixture was evaporated to dryness on a hot water bath and subsequently calcined in air at 500° C. for 3 hours to convert the manganese nitrate to manganese (II) oxide. 20 cc. of this oxide were dissolved in 20 cc. of a pyridine solution containing 0.2 g. of palladium (II) acetate and 0.2 g. of silver (I) acetate and evaporated to dryness on a hot water bath. 20 cc. of the resultant catalyst, 50 cc. of m-xylene and 5 cc. of acetic acid were charged in the same microbomb as in Example 1 and 10 Kg./cm². (gauge) of ethylene and 30 Kg./cm². (gauge) of oxygen were introduced. The reaction was carried out by placing the microbomb in an oscillating oil bath maintained at 120° C. for 5 hours. The yield of 2,4-dimethyl styrene per one mol of palladium was 380 percent and the formation of a trace of vinyl acetate was observed. After analysis, the reaction solution was returned to the microbomb and the same amounts of ethylene and oxygen as mentioned above were introduced therein. The reaction was carried out in the same manner for another 10 hours. The yield of 2,4-dimethyl styrene per one mole of palladium were 840 percent and traces of m-tolualdehyde and acetaldehyde besides the above-mentioned vinyl acetate were observed.

EXAMPLE 7

0.1 g. of palladium (II) monochloroacetate and 0.1 g. of cupric monochloroacetate were dissolved in 30 cc. of an aqueous ammonia solution and 0.1 g of chromium trioxide previously supported on 10 cc. (4 g.) of granular active carbon was added thereto. The whole mixture was evaporated to dryness on a hot water bath. 10 cc. of this catalyst, 50 cc. of o-xylene and 3 cc. of butyric acid were charged in a 100 cc. microbomb and 10 Kg./cm². (gauge) of ethylene and 50 Kg./cm². (gauge) were introduced. The reaction was carried out at 130° C. for 2 hours. The yield of 3,4-dimethyl styrene per one mol of palladium was 310 percent and traces of vinyl acetate and acetaldehyde were observed. In the same manner as in Example 6 the reaction was carried out for another 10 hours. The yield of 3,4-dimethyl styrene per one mol of palladium was then 500 percent and the formation of a trace of o-tolualdehyde besides the above-mentioned vinyl acetate and acetaldehyde was observed.

EXAMPLES 8 TO 13

The reactions were effected in the same manner as in Example 6 using catalysts prepared in the same manner as in Example 6. The results are shown in Table 5. The yield of 2,4-dimethylstyrene is based upon the introduced m-xylene and the selectivity is based upon the reacted m-xylene. The amount of the nitrogen containing compounds used in the preparation of the catalysts was 100 cc. per 1 g. of the palladium compound. In these Examples the effect of the nitrogen containing compounds is clear.

EXAMPLE 14

2.78 g. of manganese nitrate $Mn(NO_3)_2 \cdot 6H_2O$ were dissolved in 100 cc. of water and 50 cc. (27.5 g.) of silica were added thereto. The mixture was evaporated to dryness on a hot water bath at 500° C. for 5 hours to convert the manganese nitrate to the manganese (II) oxide. 20 cc. of this oxide were immersed in a 20 cc. pyridine solution containing 0.2 g. of palladium acetate and 0.2 g. of thallium (III) acetate and the whole mixture was evaporated to dryness on a hot water bath. 20 cc. of this catalyst, 20 cc. of m-xylene and 5 cc. of acetic acid were charged in a 100 cc. microbomb and the microbomb was sealed. Ten Kg./cm². (gauge) of ethylene and 30 Kg./cm². (gauge) of oxygen were initially introduced therein and the microbomb was sealed and placed in an oscillating oil bath maintained at 120° C. for 5 hours. The yield of 2,4-dimethylstyrene based upon the introduced m-xylene was 0.9 percent and the selectivity based upon the reacted m-xylene was 99 percent. After analysis the reaction solution was returned to the microbomb and the same amounts of ethylene and oxygen as mentioned above were again introduced therein. The reaction was effected in the same manner as mentioned above for another 15 hours. The yield of 2,4-dimethylstyrene based upon the introduced m-xylene was 2.5 percent and the selectivity based upon the reacted m-xylene was 97 percent. The reaction was further effected for another 25 hours. The yield of 2,4-dimethylstyrene based upon the introduced m-xylene was 3.7 percent and the selectivity based upon the reacted m-xylene was 97 percent.

EXAMPLE 15

Using the same catalyst and reaction conditions as in Example 14 and a mixture of 10 cc. of m-xylene and 40 cc. of p-xylene, the reaction was carried for 20 hours. The conversion of m-xylene was 14 percent and 97 percent of the converted material was 2,4-dimethylstyrene. Only a trace of the p-xylene was converted and the formation 2,5-dimethylstyrene was not observed. The reaction was further effected for another 20 hours and the conversion of m-xylene increased up to 22 percent while the conversion of p-xylene was negligible. The volume ratio of p-xylene to m-xylene increased from 4:1 to 5.1:1.

EXAMPLE 16

3.31 g. of lead nitrate $Pb(NO_3)_2$ were dissolved in 100 cc.of water and 50 cc. (27.5 g.) of granular silica gel were added thereto. The mixture was evaporated to dryness and subsequently calcined in air at 400° C. for 10 hours to convert the lead nitrate to lead (II) oxide. Then the lead oxide was immersed in a 50 cc. pyridine solution containing 0.5 g. of palladium (II) acetate and the whole mixture was evaporated to dryness. 50 cc. of this catalyst were filled in a reaction tube of heat-resistance glass of 20 mm. inside diameter and the reaction tube was placed in an electric furnace maintained at 150° C. A gaseous or vaporous mixture of ethylene, m-xylene acetic acid and oxygen at a mol ratio of 5:1:0.5:2 was introduced at a flow ratio of 100 cc./min. The one pass yield of 2,4-dimethyl styrene based on the introduced m-xylene was 7 percent over 2 hours and the formation of by-products was negligible.

EXAMPLE 17

Using 50 cc. of the same catalyst as in Example 11 and the same reactor as in Example 16, a gaseous mixture of ethylene, o-xylene, acetic acid and oxygen at a mole ratio of 5:1:1:2 was introduced at a flow rate of 200 cc./min. The one pass yield of 3,4-dimethyl styrene based on the introduced o-xylene was 4.8 percent over 2 hours.

EXAMPLES 18 TO 23

Similar reactions were carried out using the same reactor as in Example 16 and the reaction conditions and catalysts as set forth in Table 6.

TABLE 1

| Catalyst No. | Catalyst | starting material | Yield * Reaction time |  |  |
|---|---|---|---|---|---|
|  |  |  | 5 hrs. (mol %) | 15 hrs. (mol %) | 25 hrs. (mol %) |
| 1 | Pd(II)(OCOCH₃)₂ 0.2g. | Benzene | Styrene 15 Stilbene 55 | — | — |
|  |  |  | 2,4-dimethylstyrene 85 | 80 | — |
| 2 | {Pd(II)(OCOCH₃)₂ SiO₂} Pyridine 0.1 g. 10 cc. (5.5 g.) | m-xylene | 2,4-dimethylstyrene 75 | 125 | 175 |
| 3 | {Pd(II)(OCOCH₃)₂- Ag(I)(OCOCH₃)- 0.2 g. 0.2 g. -SiO₂ } Aqueous 20 cc. (11 g.) ammonia | m-xylene | 2,4-dimethylstyrene 120 | 230 | 305 |
| 4 | {Pd(II)(OCOCH₃)₂- Mn(II)O-SiO₂ 0.1 g. 0.2 g. 10 cc. (5.5 g.) } Pyridine | m-xylene | 2,4-dimethylstyrene 300 | 690 | 880 |

Reaction Conditions:
Reactor : cc. autoclave
Reaction temperature : 120°C.
Ethylene : 10 Kg./cm². (gauge);
m-Xylene (or Benzene) : 50 cc.
Oxygen : 30 Kg./cm². (gauge),
Acetic acid as an acid : 5 cc.

*Yield per one mol of palladium

TABLE 2

| Catalyst No. | Catalyst | Treating agent (10 cc.) | Yield * (Over 15 hours after starting of reaction) |  | Selectivity * (mol %) |
|---|---|---|---|---|---|
|  |  |  | 2,4-Dimethyl styrene (mol %) | m-Tolualdehyde (mol %) |  |
| 5 | Pd(II)(OCOCH₃)₂-SiO₂ 2.1 g. 10 cc. (5.5 g.) | H₂O | 115 | 80 | 59 |
| 6 | — Do — | CH₃OH | 120 | 115 | 51 |
| 7 | — Do — | CH₃COOH | 150 | 105 | 59 |
| 8 | — Do — |  | 140 | 10 | 93.5 |
| 9 | — Do — | NH₄OH | 120 | 5 | 96 |
| 10 | — Do — | CH₃CN | 125 | 15 | 89 |

Reaction Conditions:
Reactor : 100 cc. microbomb
Reactor Temperature : 120°C.
Ethylene : 10 Kg./cm². (gauge);
m-Xylene : 30 cc.
Oxygen : 30 Kg./cm². (gauge);
Acetic acid as an acid : 2 cc.

*Yield per one mol of the palladium
**Selectivity = Yield of 2,4-dimethylstyrene/Yield of 2,4-dimethylstyrene + Yield of m-tolualdehyde × 10²

TABLE 3

| Catalyst No. | Catalyst | triphenyl phosphine (mg.) | Yield* (Selectivity**) of 2,4-dimethylstyrene Reaction time |  |  |
|---|---|---|---|---|---|
|  |  |  | 5 hrs. (mol %) | 25 hrs. (mol %) | 50 hrs. (mol %) |
| 11 | {Pd(II)(OCOCH₃)₂- Cu(II)(OCOCH₃)₂ 0.3 g. 0.5 g. (Pb(II)O - SiO₂) 0.4 g. 20 cc. (11 g.)} | — | 1.1 (92) | 1.8 (80) | 2.0 (63) |
|  |  | 75 | 0.9 (95) | 17 (84) | 2.2 (84) |
| 12 | {Pd(II)(OCOCH₃)₂- (WO₃-SiO₂·Al₂O₃ 0.1 g. 0.25 g. 10 cc. (6 g.)} | — | 0.2 (97) | 0.8 (83) | 1.2 (72) |
|  |  | 30 | 0.2 (97) | 0.8 (84) | 1.4 (84) |

Reaction Conditions:
Reactor : 100 cc. microbomb
Reaction temperature : 130°C.
Ethylene : 15 Kg./cm². (gauge),
Oxygen : 30 Kg./cm². (gauge)
m-Xylene : 50 cc., Acetic acid : 5 cc.

* Yield based on the introduced m-xylene
** Selectivity based on the reacted m-xylene

TABLE 4

| Catalyst No. | Catalyst | Xylene | Conversion of xylene (mol %) Reaction time |  | Yield* (mol %) reaction time |  |
|---|---|---|---|---|---|---|
|  |  |  | 10 hrs. | 30 hrs. |  | 10 hrs. | 30 hrs. |
| 13 | {Pd(II)(OCOCH₃)₂- (Mn(II)O-SiO₂) 0.2 g. 0.5 g. 20 cc. (11 g.) Pyridine} | m-Xylene | 1.9 | 3.1 | 2,4-dimethyl-styrene | 2.3 1.7 |
|  |  | p-Xylene | 0.4 | 1.0 | 2,5-dimethyl-styrene | 0.6 0.3 |
| 14 | {Pd(II)(OCOCH₃)₂- Tl(III)(OCOCH₃)₃- 0.2 g. 0.5 g. -(Mn(II)O - SiO₂) 0.5 g. 20 cc. (11 g.)} pyridine | m-Xylene | 2.1 | 3.3 | 2,4-dimethyl-styrene | 2.8 1.9 |
|  |  | p-Xylene | 0 | Trace | 2,5-dimethyl-styrene | 0 0 |

Reaction Conditions:
Reactor : 100 cc. autoclave
Reaction temperature : 120°C.
Ethylene : 10 Kg./cm². (gauge) ;
Xylene : 50 cc.
Oxygen : 30 Kg./cm². (gauge) ;
Acetic acid as an acid : 5 cc.

* Yield based upon the introduced xylene 3,689,583

TABLE 5

| Example No. | Catalyst | m-Xylene (cc.) | Acetic acid (cc.) | Triphenyl-phosphine (mg.) | $C_2H_4/O_2$ (kg./cm.$^2$ gauge) | Temperature (°C.) | Yield of 2,4-dimethylstyrene (selectivity) (mol percent) Reaction time | | |
|---|---|---|---|---|---|---|---|---|---|
| | | | | | | | 5 hrs. | 25 hrs. | 50 hrs. |
| 8 | {[Pd(II)(OCOCH$_3$)$_2$—(Mn(II)O—SiO$_2$]Acetonitrile. 0.1 g.  0.2 g. 10 cc. (5.5 g.) | 30 | 2 | 10 | 10/30 | 120 | 0.3 (96) | 1.1 (88) | 1.7 (88) |
| | | 30 | 2 | ----- | 10/30 | 120 | 0.3 (93) | 1.0 (87) | 1.4 (75) |
| 9 | {[Pd(II)(OCOC$_2$H$_5$)$_2$—(Mn(VI)O—SiO$_2$]Pyridine. 0.3 g.  0.5 g. 50 cc. (27.5 g.) | 70 | 3 | 200 | 10/30 | 120 | 0.5 (99) | 1.3 (92) | 1.9 (92) |
| | | 70 | 3 | ----- | 10/30 | 120 | 0.6 (97) | 1.1 (89) | 1.5 (78) |
| 10 | {[Pd(II)(OCOCH$_3$)$_3$—Mn(III)(OCOCH$_3$)$_3$—SiO$_2$]Pyridine. 0.1 g.  0.2 g. 10 cc. (6.5 g.) | 50 | ----- | 50 | 20/20 | 120 | 0.2 (85) | 0.6 (80) | 0.8 (79) |
| | | 50 | ----- | 50 | 20/20 | 120 | 0.3 (75) | 0.4 (58) | 0.4 (45) |
| 11 | {[Pd(II)(OCOCH$_3$)$_2$—Mn(III)(OCOCH$_3$)$_3$—(Cu(II)O—Al$_2$O$_3$)]Aqueous ammonia. 0.2 g.  0.1 g.  0.4 g. 20 cc. (12 g.) | 50 | 5 | 75 | 15/20 | 130 | 0.6 (86) | 0.9 (75) | 1.1 (73) |
| | | 50 | 5 | ----- | 15/20 | 130 | 0.7 (81) | 0.8 (54) | 0.8 (40) |
| 12 | {[Pd(II)(OCOCH$_3$)$_2$—Ag(I)—(Fe(III)O$_3$—SiO$_2$)]Benzonitrile. 0.1 g.  0.1 g. 10 cc. (5.5 g.)  0.2 g. | 50 | 5 | 100 | 10/30 | 100 | 0.6 (96) | 1.0 (89) | 1.8 (88) |
| | | 50 | 5 | ----- | 10/30 | 100 | 0.7 (94) | 1.2 (88) | 1.7 (71) |
| 13 | {[Pd(II)(OCOCH$_3$)$_2$—(Ag(I)O—SiO$_2$]Aniline. 0.3 g.  0.2 g. 10 cc. (5.5 g.) | 30 | 5 | 30 | 2/5 | 140 | 0.9 (92) | 1.6 (87) | 2.0 (85) |
| | | 30 | 5 | ----- | 2/5 | 140 | 0.9 (91) | 1.4 (83) | 1.8 (65) |

TABLE 6

| Example No. | Catalyst | Composition of feeding gaseous mixture (mol ratio) | | | | Flow rate (cc./min.) | Temperature (°C.) | Conversion of m-xylene (mol percent) | Selectivity of 2,4-stylene* (mol percent) |
|---|---|---|---|---|---|---|---|---|---|
| | | m-Xylene | Ethylene | Acetic acid | Oxygen | | | | |
| 18 | {[Pd(II)(OCOCH$_3$)$_2$—Cr(II)IOCOCH$_3$)$_3$—Mn(III)(OCOCH$_3$)—Al$_2$O$_3$B$_2$O$_3$]Pyridine. 0.2 g.  0.1 g.  0.5 g. 20 cc. (13 g.) | 1 | 3 | 0.1 | 1 | 100 | 150 | 3.5 | 92 |
| 19 | {[Pd(II)(OCOCH$_3$)$_2$—Ti(III)(OCOCH$_3$)$_3$—(Mo(IV)O—Al$_2$O$_3$)]Pyridine. 0.2 g.  0.5 g.  0.5 g. 20 cc. (12 g.) | 1 | 1 | 0.1 | 1 | 100 | 150 | 1.5 | 87 |
| 20 | {[Pd(II)(OCOCH$_3$)$_2$—Pd(II)(OCOC$_2$H$_5$)$_2$—(W(IV)O$_2$—Al$_2$O$_3$)]Pyridine. 0.3 g.  0.1 g.  0.3 g. 20 cc. (12 g.) | 1 | 2 | 0.1 | 5 | 100 | 160 | 6.2 | 91 |
| 21 | {[Pd(II)(COCH$_3$)$_2$—Mn(III)(OCOCH$_3$)—(Ti(I)O—SiO$_2$)]Pyridine. 0.2 g.  0.2 g.  0.1 g. 20 cc. (11 g.) | 1 | 1 | 0.1 | 2 | 100 | 120 | 2.0 | 96 |
| 22 | {[Pd(II)(OCOCH$_3$)$_2$—Mn(III)(OCOCH$_3$)—Cr(III)O$_3$—Cu(II)O—SiO$_2$]Pyridine. 0.2 g.  0.4 g.  0.2 g.  0.5 g. 20 cc. (11 g.) | 1 | 3 | 0.1 | 2 | 100 | 130 | 3.3 | 90 |
| 23 | {[Pd(II)(OCOCH$_3$)$_2$—Ti(III)(OCOCH$_3$)$_3$—Active carbon)]Pyridine. 0.2 g.  0.3 g. 20 cc. (10.4 g.) | 2 | 1 | 1 | 2 | 100 | 150 | 2.5 | 93 |

*Selectivity based on the reacted m-xylene.

What is claimed is:

1. A process for preparing a dimethylstyrene which comprises contacting at a temperature of about 30° C to 400° C a xylene, ethylene and oxygen with a catalyst consisting essentially of a lower aliphatic carboxylate of palladium supported on a porous carrier and treated with at least one nitrogen-containing compound selected from the group consisting of quinoline, pyridine, ethylamine, aniline, acetonitrile, benzonitrile and aqueous ammonia.

2. The process of claim 1 wherein said lower aliphatic carboxylate is selected from the group consisting of palladium (II) acetate, palladium (II) propionate and palladium (II) monochloroacetate.

3. The process as claimed in claim 1, wherein said porous carrier is selected from the group consisting of silica, alumina, silica-alumina, boria and active carbon and said catalyst is selected from the group consisting of palladium (II) acetate, palladium (II) propionate and palladium (II) monochloroacetate.

4. The process of claim 3 wherein the process is effected essentially in the gas phase.

5. The process as claimed in claim 1, wherein said catalyst is supported on the porous carrier together with, as a promotor, at least one member selected from the group consisting of the oxides and a second lower aliphatic carboxylate of a member of the group of copper (II), silver (I), lead (II), chromium (II, III, VI), molybdenum (IV, V), tungsten (IV, VI), manganese (II, III), iron (III) and thallium (I, III).

6. The process as claimed in claim 3, wherein said second lower aliphatic carboxylate is selected from the group consisting of acetate, propionate and monochloroacetate.

7. The process as claimed in claim 3, wherein the reaction temperature is in the range of about 50° C. to 200° C.

8. The process as claimed in claim 1 wherein the reaction is effected in the presence of triphenyl phosphine in a proportion of about 10 to 500 mg. per one mol of said xylenes.

9. A process for preparing dimethylstyrenes which comprises contacting a mixture of xylenes containing p-xylene, ethylene and free-oxygen containing gas at a temperature of about 30° C. to 400° C. with a catalyst supported on a porous carrier, said catalyst comprising as essential ingredients a lower aliphatic carboxylate of palladium (II) and a member selected from the group consisting of a lower aliphatic carboxylate and an oxide of thallium (I, III), as a promotor.

10. The process as claimed in claim 9, wherein the mixture of xylene is a mixture of p-xylene and m-xylene.

11. The process as claimed in claim 9, wherein the catalyst additionally contains at least one member selected from the group consisting of the oxides and the lower aliphatic carboxylates of copper (II), silver (I), lead (II), chromium (II, III, VI), molybdenum (IV, V), tungsten (IV, V), manganese (II, III) and iron (III).

* * * * *